United States Patent
Fabre

[11] 3,905,785
[45] Sept. 16, 1975

[54] SPRAY BOOTH BOTTOM COLLECTOR

[75] Inventor: Pierre Fabre, Grenoble, France

[73] Assignee: Air Industrie, Courbevoie, France

[22] Filed: Apr. 2, 1973

[21] Appl. No.: 346,844

[30] Foreign Application Priority Data
Apr. 27, 1972 France .............................. 72.15586

[52] U.S. Cl. ...................... 55/96; 55/303; 118/326; 118/634; 98/115 SB
[51] Int. Cl. ............................................ B01d 46/04
[58] Field of Search ....... 55/96, 302, 303, 385, 467, 55/57, 417, 419; 98/115 SB; 118/326, 634, DIG. 7; 117/102

[56] References Cited
UNITED STATES PATENTS
| | | | |
|---|---|---|---|
| 1,538,292 | 5/1925 | Lindsay | 55/303 |
| 3,252,401 | 5/1966 | Smith | 98/115 SB |
| 3,741,155 | 6/1973 | Hunder | 98/115 SB |

FOREIGN PATENTS OR APPLICATIONS
| | | | |
|---|---|---|---|
| 1,337,469 | 8/1963 | France | 98/115 SB |

*Primary Examiner*—Bernard Nozick
*Attorney, Agent, or Firm*—Brisebois & Kruger

[57] ABSTRACT

The present invention relates to a method of creating a depression in a chamber for the electrostatic deposition of powder on objects, and of recovering the unused surplus powder in said chamber, said method comprising essentially the step of applying in alternation a suction effect and a blowing effect through one or a plurality of air-permeable inclined plates which may constitute all or part of the bottom of said chamber. The powder-recovery device comprises a fan cooperating with a three-way valve in applying the said alternate suction and blowing effects to the inclined air-permeable plates which constitute a filter to separate the particles of powder from the conveying air. The suction period is made from five to twenty times longer than the blowing period, while the blowing intensity may be equal to, greater than or less than the suction intensity. The blowing and suction effects may be applied selectively over various parts of the surfaces of the inclined filter plates, and said plates may have flat, concave or convex surfaces which may furthermore be roughened or corrugated.

The invention also covers the electrostatic powder deposition cabin utilizing the method, and the installation embodying the said chamber.

23 Claims, 18 Drawing Figures

SPRAY BOOTH BOTTOM COLLECTOR

The present invention relates to a method providing the necessary depression in a chamber for electrostatically depositing powder on objects, and also of recovering the unused powder in the said chamber. The invention also relates to an electrostatic powder deposition chamber utilizing the said method.

A manual or automatic powder deposition installation usually comprises:
— at least one electrostatic generator for supplying a direct-current high-tension voltage, generally between about thirty and one hundred kilovolts;
— at least one distributor tank for supplying powder to the projection device or devices;
— one or more manual or automatic guns, fixed or mounted on carriers;
— a powder deposition chamber either wide open at the front in the case of manual powdering, or having an input and an output lock-chamber for the parts in the case of automatic deposition. Due to these openings which the chamber essentially comprises, it is necessary to maintain a sub-atmospheric pressure inside the chamber in order to prevent particles of powder from being evacuated outside the chamber;
— a powder-recovery device coupled to the chamber by a conduit and comprising a fan which enables the excess powder to be sucked from, the chamber and also to create therein the necessary sub-atmospheric pressure;
— when so required, a re-cycling device for the recovered powder coupling the powder recovery device to the distributor-tank.

The powder recovery device comprises a filtering device enabling the particles of powder to be separated from the air which conveys them, and permits the collection of these particles in order to re-use them if necessary. This filtration device comprises conventionally a cyclone extractor for effecting the separation of the heavier particles (with a diameter greater than about 15 microns) and, coupled to the said cyclone and in succession thereto, a fine filter composed of filter sleeves of fabric enabling particles having a diameter less than 15 microns to be separated out.

In order to be able to maintain a sufficiently low pressure inside the chamber, the flow of suction air must be large, of the order of four thousand cubic metres per hour for standard, automatic chambers sold commercially by the applicant's assignee. In order to prevent fouling and rapid blocking-up of the filter sleeves, it is necessary to give these latter a total filtration surface area of about forty square metres, which results in installations of huge dimensions.

It has already been proposed, in accordance with French Pat. No. 2,136,984 to eliminate the second part of the recovery device (that is to say the fine filter). With powders having a large grain, satisfactory results are thus obtained, and it is even possible to change the colour rapidly, as the cyclone extractor is itself relatively easy to clean. Unfortunately, the powders at present in use are very fine, about 70% of the particles having a diameter less than 30 microns, and it is now no longer possible to dispense with the fine filtration device.

Practically no satisfactory means exist for cleaning the filter-sleeves and these become fouled-up within a more or less long period. As a result of this fouling, the flow of suction air diminishes, the fouling increases still more, which results in a defective operation of the installation. Furthermore, with a device of this kind, each change of colour necessitates changing the filter sleeves, which is a long and inconvenient operation on an industrial scale.

An improvement in the preceding device consisted of providing a powder recovery device comprising solely a sufficient number of vertical filter-sleeves, open towards the bottom and closed towards the top, the separated powder falling by gravity into the bottom of the recovery device and the filtered air being evacuated towards the top. The cleaning of the filter sleeve is carried out either by vibration or by periodic injection of compressed air in counter-flow.

This device has the advantage of ensuring in all cases a total recovery of the unused powder. It is however costly, very bulky and always unsuited to rapid changing of colour; it is finally very dangerous due to the risk of explosion caused by the high concentration of powder in a closed air space contained in the powder recovery device.

A last improvement has consisted of placing a sufficient number of filter sleeves in the interior of the chamber, thus eliminating the connection between the chamber and recovery device. As the suction is effected through the interior of the filter sleeves, the powder is collected from the exterior of these sleeves. The filter sleeves are cleaned in turn by a jet of compressed air directed in counter-flow. The powder then falls into the bottom of the chamber from which it is collected by means of a scraper.

This device has the advantage of being cheap and fairly small in size, the recovery device being included in the chamber. On the other hand, it has the disadvantage of always being unsuitable for rapid change of colour, of always utilizing filter sleeves of fabric which block-up fairly rapidly, and of necessitating a mechanical device for scraping-up the powder deposited in the bottom of the chamber.

In addition, in order to leave sufficient space for the parts to be coated and the projection nozzles, these filter sleeves are located in the four corners of the chamber. In consequence, the suction in the chamber is irregular, which has the consequence of giving a non-uniform distribution of powder in the chamber, and therefore a coating of the objects which is non-uniform.

The method according to the invention enables these drawbacks to be overcome. In fact, it makes it possible simultaneously to create the necessary depression in the chamber and to recover the unused powder in a simple, effective, danger-free and inexpensive manner, permitting changing of colour very rapidly. It is characterized in that it consists of carrying out alternately a blowing and suction operation through one or more inclined plates, permeable to air and constituting the bottom of the chamber.

The invention will be better understood by means of the description which follows below, describing by way of example one embodiment of a chamber employing the method of the invention, reference being made to the accompanying drawings, in which.

Figure 1:
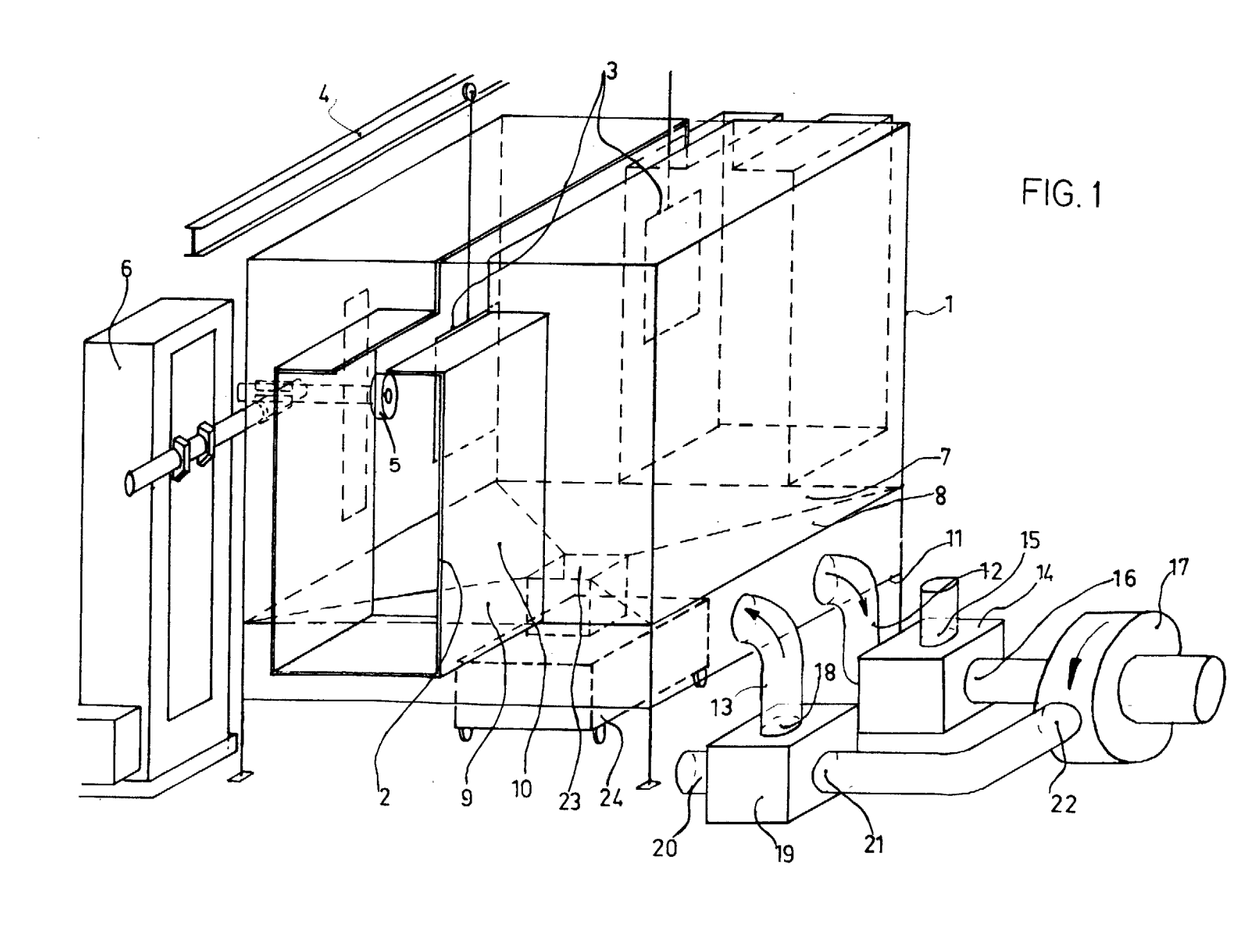
FIG. 1 shows diagrammatically an automatic electrostatic powdering chamber according to the invention.

In FIG. 1, reference numeral 1 indicates an automatic powder deposition chamber comprising, in a manner known per se:

— an inlet lock-chamber 2 for the parts 3 suspended from a travelling conveyor 4 arranged on the inlet side of the deposition chamber;

— an outlet lock-chamber for the said parts arranged on the outlet side of the deposition chamber;

— an automatic device 5 for the electrostatic projection of powder, mounted on a carrier 6 which gives it a to-and-fro movement;

— a bottom constituted, in accordance with French Pat. No. 1,337,469, by a number of inclined plates 7, 8, 9 and 10, forming in the present case an inverted pyramid open towards the bottom.

According to the invention, the plates 7, 8, 9 and 10 are composed of a porous and air-permeable material which is preferably stiff and smooth; in the case of metal plates, it will be advantageous to connect them to the electrical ground of the installation, in order to ensure the electric discharge of the particles of powder which fall on to the plates. In addition to the plates 7, 8, 9 and 10, the chamber comprises at its extreme lower portion, a bottom 11 so as to define between the said plates and this bottom a closed fluid-tight space in which a suction conduit 12 and a blowing conduit 13 terminate.

The suction conduit 12 is connected to a first inlet of a three-way valve 14, the second inlet 15 of which is connected to the ambient air, and the outlet 16 of which is coupled to the suction inlet of a fan 17 which rotates continuously in the same direction. The blowing conduit 13 is connected to one of the outlets 18 of a second three-way valve 19, a second outlet 20 of which is connected to free air, and the inlet 21 of which is coupled to the delivery outlet 22 of the fan 17.

The operation, preferably by coupling, of the three-way valves 14 and 19, permits the application either of a suction through the conduit 12 or blowing through the conduit 13, according to the basic diagram shown in FIGS. 3a and 3b and the constructional diagram shown in FIGS. 4a, 4b, 4c, 4d, 4e, 4f and 5, to which further reference will be made in detail later.

The unused powder falls through the central orifice 23 into a recovery device, formed in this case by a movable trolley 24, mounted on rollers, placed underneath the second bottom 11 of the chamber 1, which is itself mounted on feet. The powder thus collected may therefore be periodically poured back into the powder distributor tank provided for the installation. It is also possible to equip the installation, in a manner known per se, with a re-cycling device which sucks the powder contained in the recovery device 24 and re-injects it into the powder distributor tank.

The operation of the device shown in FIG. 1 will now be explained by means of the basic diagram given in FIGS. 3a and 3b.

Each of the three-way valves 14 and 19 has a gate (25 and 26 respectively) movable at will about an axis in such a manner as to close, in each of its extreme positions, one or the other of the two inlets of the three-way valve on which it is provided.

Figure 3A:
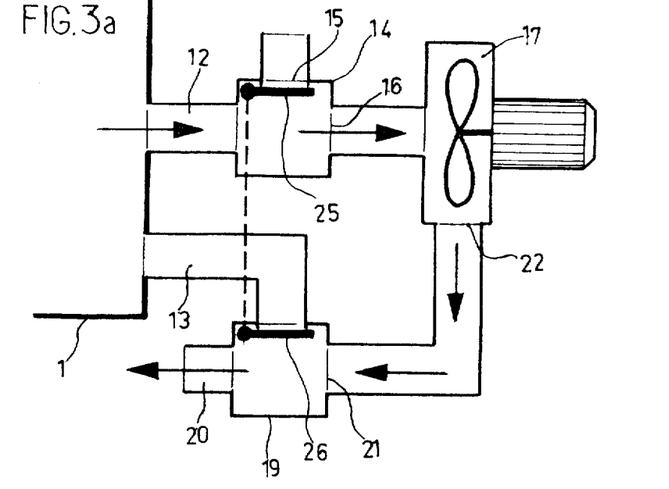
FIGS. 3a and 3b show the basic diagram of the suction and blowing device.

In FIG. 3a, the gates 25 and 26 which are assumed to be coupled together for convenience of simultaneous operations, are in the top position so as to respectively close the inlets 15 and 13. In consequence, the suction inlet of the fan 17 is directly connected to the conduit 12, while the delivery outlet 22 of the fan 17 is directly connected to the ambient air by the conduit 20. There is thus applied a suction of the air contained in the chamber through the plates 7, 8, 9 and 10 which are permeable to air.

Figure 3B:
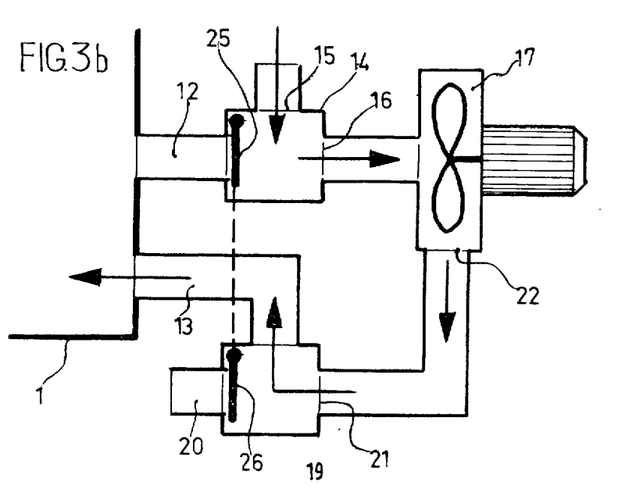

If necessary, it is also possible to regulate at will the intensity of this suction by eliminating the coupling between the gates 25 and 26, holding the gate 26 in its top position but giving the clapper 25 a position intermediate between its top position, which is that of FIG. 3a, and its bottom position which is that of FIG. 3b. The fan 17 then partly sucks-in the external air through the inlet 15 and the air from thee chamber through the conduit 12, so that the intensity of suction through this latter is reduced.

In FIG. 3b on the other hand, the gates 25 and 26 are in the bottom position so as to completely close the outlets towards the conduits 12 and 20. In consequence, the suction inlet of the fan 17 is directly connected to the ambient air, while its delivery outlet is directly connected to the conduit 13.

There is thus applied a blowing effect towards the top of the chamber through the plates 7, 8, 9 and 10, which are permeable to air. If necessary, it is also possible to regulate at will the intensity of this blowing by eliminating the coupling between the gates 25 and 26, maintaining the gate 25 in its bottom position but giving the gate 26 a position intermediate between its top position which is that of FIG. 3a and its bottom position which is that of FIG. 3b. The air delivered by the fan 17 is therefore partly ejected towards the exterior through the conduit 20 and towards the chamber 1 through the conduit 13, so that the blowing intensity through this latter is reduced.

By means of the device shown diagrammatically in FIGS. 3a and 3b, it is therefore possible to apply successively, with chosen relative intensities and chosen respective periods of duration, a suction and a blowing effect through the plates 7, 8, 9 and 10.

The suction phase is intended to create the necessary depression in the chamber. As the suction is uniformly made through the bottom of the cabin, the depression created is uniform. The blowing phase has the function of evacuating to the recovery tank 24 the unused powder which has fallen by gravity into the bottom of the chamber, and therefore on the plates 7, 8, 9 and 10.

Experience has in fact shown that the mere presence of inclined plates in accordance with French Pat. No.

1,337,469 is insufficient to cause all the powder to flow by gravity to the recovery tank located in the extreme bottom of the chamber, since a substantial portion of this powder nevertheless remains stuck on these plates. By means of the air blow through the plates 7, 8, 9 and 10, the powder located on these plates is fluidized, which causes a rapid flow towards the tank 24, and also the complete clearing of the said plates.

The duration of the blowing phase is advantageously chosen to be much less than the suction period. It is in fact on the one hand necessary to maintain the sub-atmospheric pressure continuously, and on the other hand, it is not useful to apply the blowing for a long period since a very short duration is sufficient to evacuate the powder towards the recuperator 24. Laboratory tests have given good results for a suction period of the order of five to twenty times greater than that of the blowing; the best results were obtained for a suction duration comprised between 10 and 20 seconds, and a blowing duration comprised between half a second and 2 seconds, the suction and blowing intensities being equal.

Under continuous operating conditions, the suction and blowing cycles succeed each other indefinitely as long as a single colour is employed. It is then convenient to control the three-way valves 14 and 19 by a timing system, of which one example is shown diagrammatically in FIGS. 4a, 4b, 4c, 4d, 4e, 4f and 5, and which will be described below in more detail.

In order to effect a change of colour, after having stopped the installation, there is carried out a mechanical or pneumatic cleaning of the inclined plates which can be rapidly completed without any essential, long and complicated dismantling operation. The tank 24 may then be removed and replaced by another, either empty or containing the powder of the new colour and then the new powder can be deposited on any article in the chamber.

It will be understood that it is also possible to construct the chamber 1 in such a manner that the plates 7, 8, 9 and 10 are removable so as to be able to take them out for cleaning, repairs, or replacement if necessary. For example, the bottom 11 may be made removable so that the plates 7, 8, 9 and 10 can be easily withdrawn.

Figure 4A:
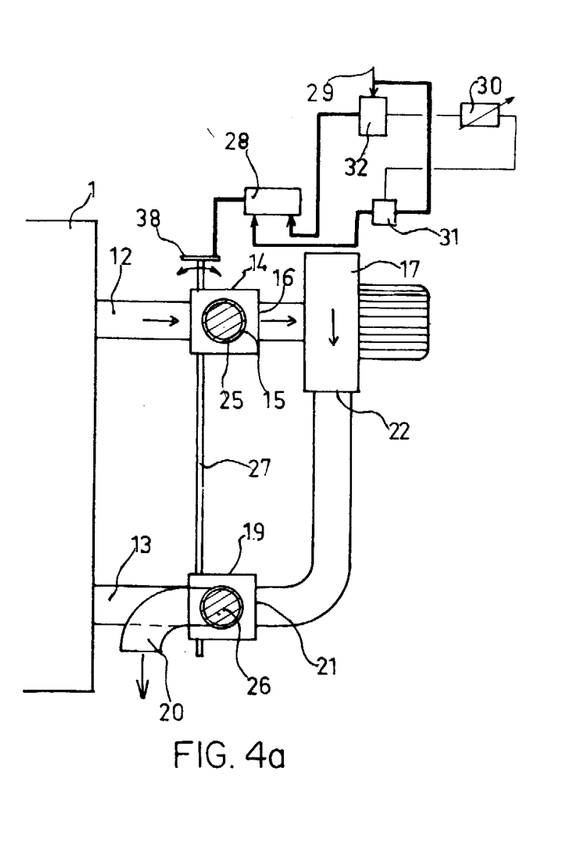
FIGS. 4a and 4b show diagrammatically the suction and blowing device, looking from above.
Figure 4B:
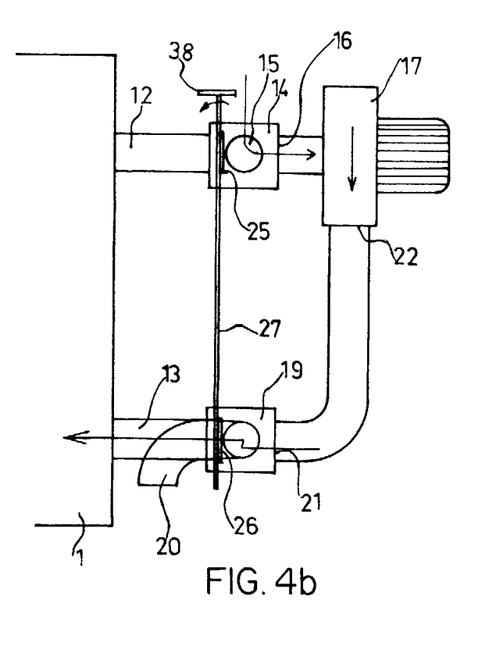
Figure 4C:
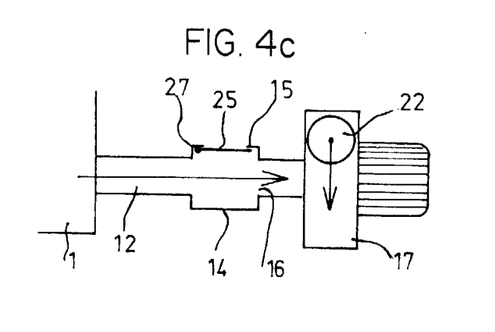
FIGS. 4c to 4f show diagrammatically a profile view of this same device.
Figure 4D:
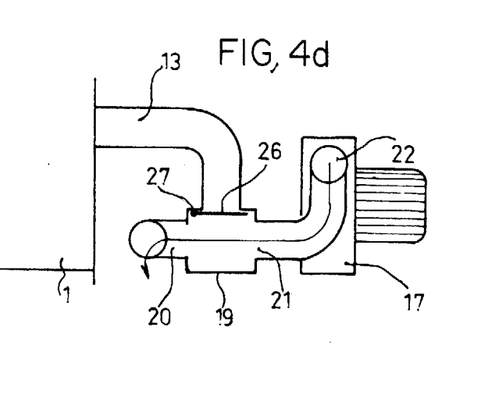
Figure 4E:
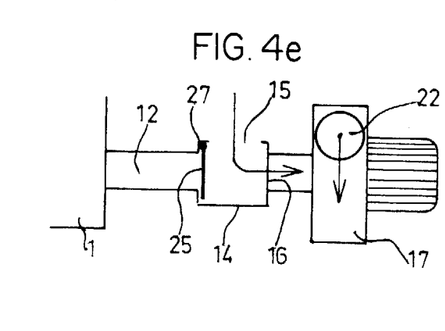
Figure 4F:
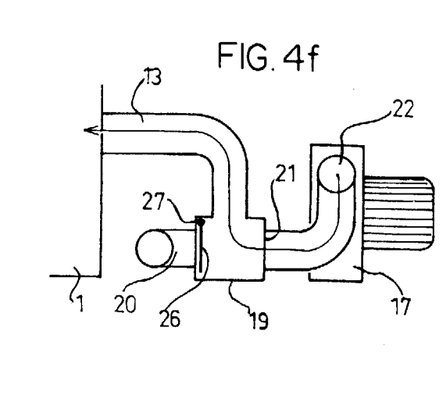
Figure 5:
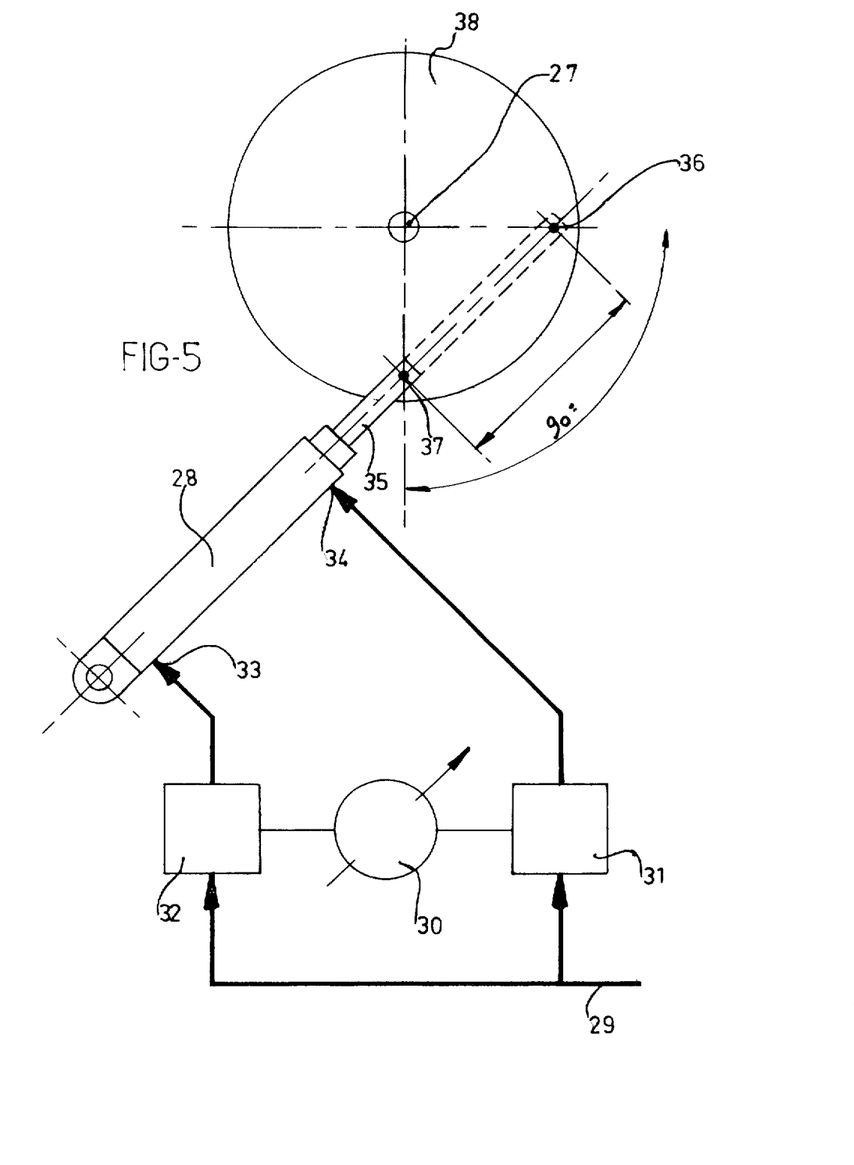
FIG. 5 shows diagrammatically the control device for the valves shown in FIGS. 4a to 4f.

FIGS. 4a and 4f and 5 illustrate the embodiment of the blowing-suction device shown schematically in FIGS. 3a and 3b.

FIGS. 4a and 4c, 4d represent the device in the suction position, showing respectively a view from above and a side view. The gates 25 and 26 pivot about a common shaft 27, the rotation of which is effected by a double-acting pneumatic jack 28 operated by a supply of compressed air 29 and under the control of a timing system 30 which actuates selectively an electro-valve 31 or an electro-valve 32.

A detailed diagram of the device controlling the rotation of the shaft 27 is given in FIG. 5. The electro-valve being open and the electro-valve closed, the compressed air coming from the conduit 29 is applied to the rear input 33 of the double-acting pneumatic jack 28. The piston of the pneumatic jack is moved to its maximum extent towards the right-hand side of the figure and the rod 35 which it operates comes into its extreme position 36, causing the wheel 38 on which it is fixed to turn through a quarter of a revolution, together with the shaft 27 which is rigidly fixed on the said wheel 38.

The other extreme position 37 is obtained in the same way, when conversely the electro-valve 31 is opened and the electro-valve 32 closed, the compressed air being then applied to the front inlet 34 of the double-acting pneumatic jack 28.

FIGS. 4b and 4e represent diagrammatically the device in the blowing position, respectively in a view from above and a view looking on the side. The control of the shaft 27 has been deliberately left out in order to avoid complication of FIG. 4b. The gates 25 and 26 having rotated through a quarter of a turn, are then located in their bottom position, in accordance with FIG. 3b.

It will be understood that the blowing-suction device in accordance with FIGS. 3a to 5 is given by way of example and not in any limitative manner, and that any other device unabling a suction and blowing operation to be carried out through the plates 7, 8, 9 and 10 in a successive manner may be employed, without thereby departing from the scope of the invention.

Although the chamber shown diagrammatically in FIG. 1 is an automatic powdering chamber comprising a single projector and a pyramidal bottom formed by flat porous plates, it will be clear that any kind of alternative forms may be utilized without departing from the scope of the invention:

— The chamber may be a manual powdering chamber, widely open at the front;

— in the case of an automatic chamber a number of projectors and carriers may be employed;

— the porous plates constituting the inclined bottom may be curved, wholly or partly, and may have concave or convex surfaces seen from the interior of the cabin;

— the surfaces of the porous plate or plates may be corrugated or roughened, at least in part;

— the inclined bottom may be constituted by a single plate;

— a number of separate blowing-suction devices may be employed, operating separately with possible different cycles, and each acting on a specific part of the bottom of the chamber.

FIGS. 2, 6a to 10 represent very diagrammatically a few examples of construction of these various alternatives.

Figure 2:
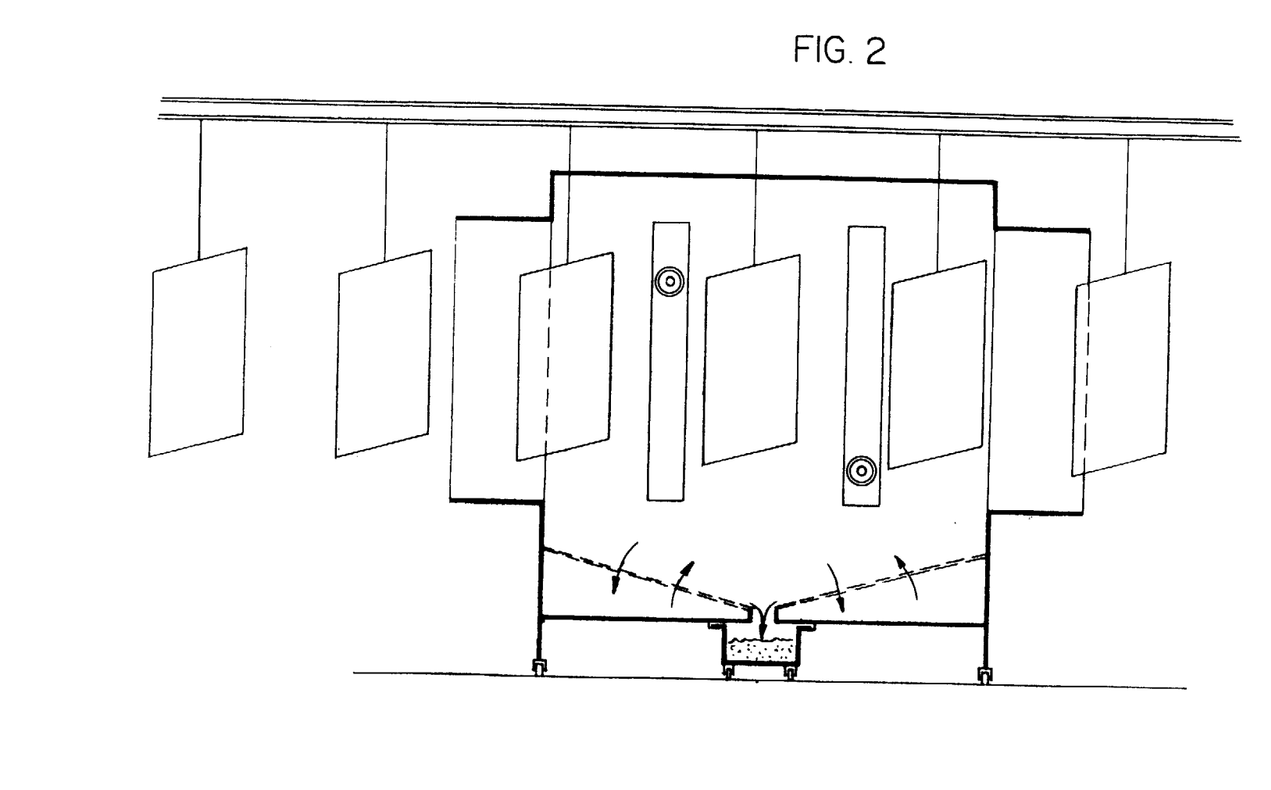
FIG. 2 represents diagrammatically an electrostatic powder deposition chamber in accordance with FIG. 1, but provided with several projection devices.

FIG. 2 shows diagrammatically a longitudinal view of a chamber according to FIG. 1, but comprising two projectors and two carriers placed in a staggered position and face to face.

Figure 6A:
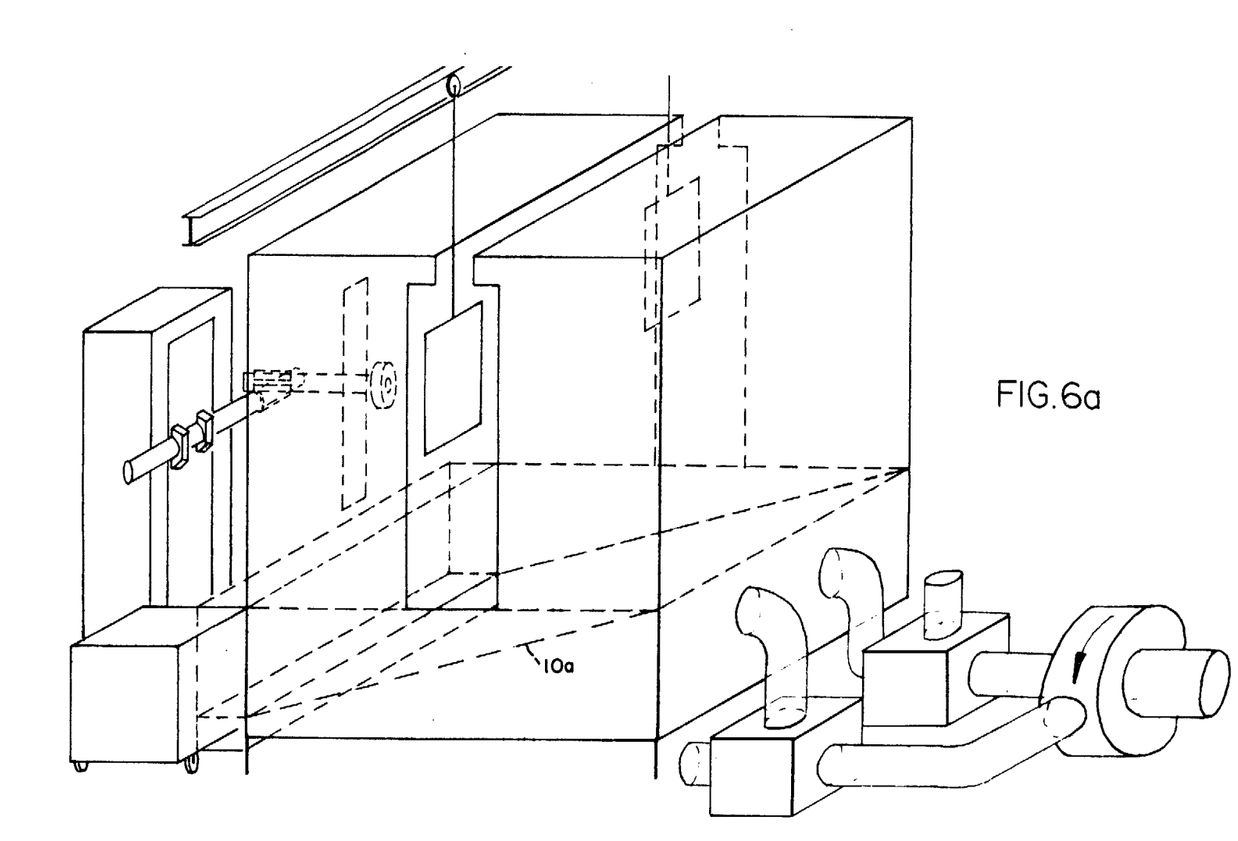
FIGS. 6a, 6b and 6c show diagrammatically an alternative form of construction of the chamber in accordance with FIG. 1.
Figure 6B:
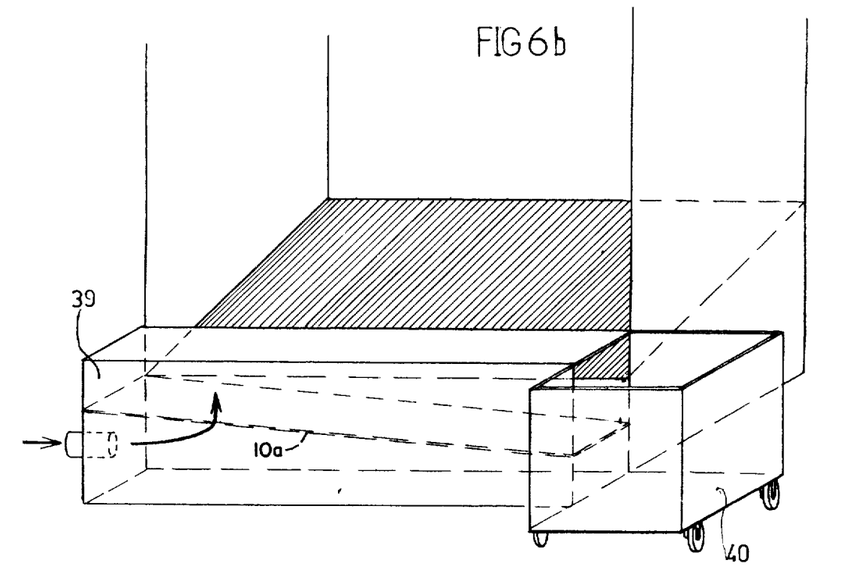
Figure 6C:
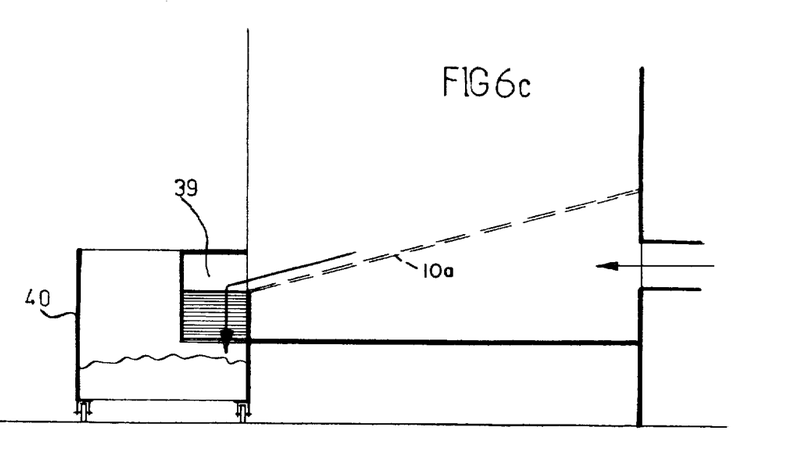

FIGS. 6a, 6b, 6c show diagrammatically a chamber according to FIG. 1, but in which the porous bottom is constituted by a single inclined plate 10a. This chamber is provided with an external device for flow to the recovery tank 40, mounted on rollers and comprising a flow spout 39 with a fluidized bottom, known per se in the art of transport of powdered products.

Figure 7:
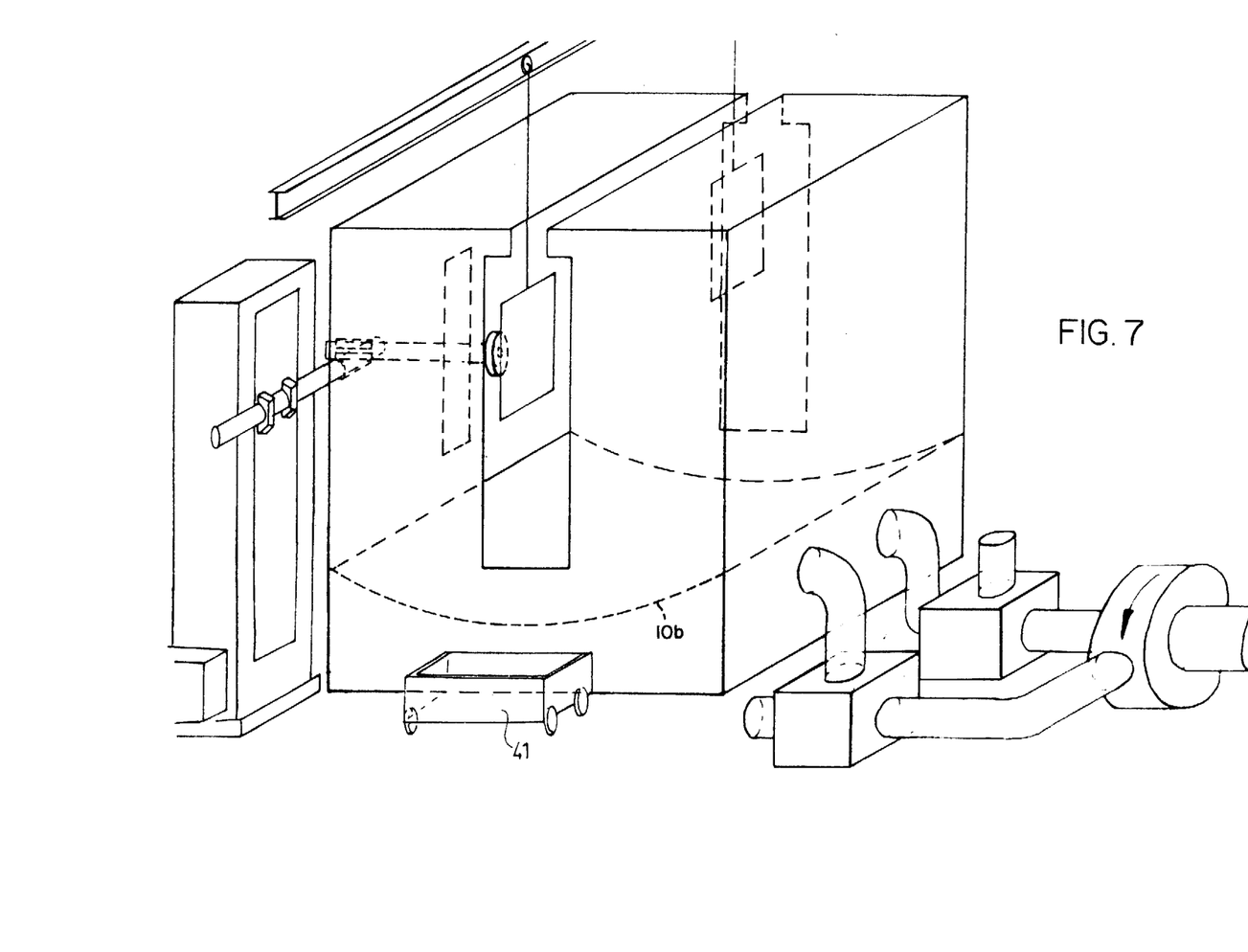
FIG. 7 shows diagrammatically another embodiment of the chamber shown in FIG. 1.

FIG. 7 shows diagrammatically a chamber in accordance with FIG. 1, in which the inclined bottom 10b is formed by a curved surface of concave shape looking from the inside of the chamber, which facilitates the flow of powder towards the recuperator tank 41, placed simply on the lowest side of the inclined gutter thus formed.

Figure 8:
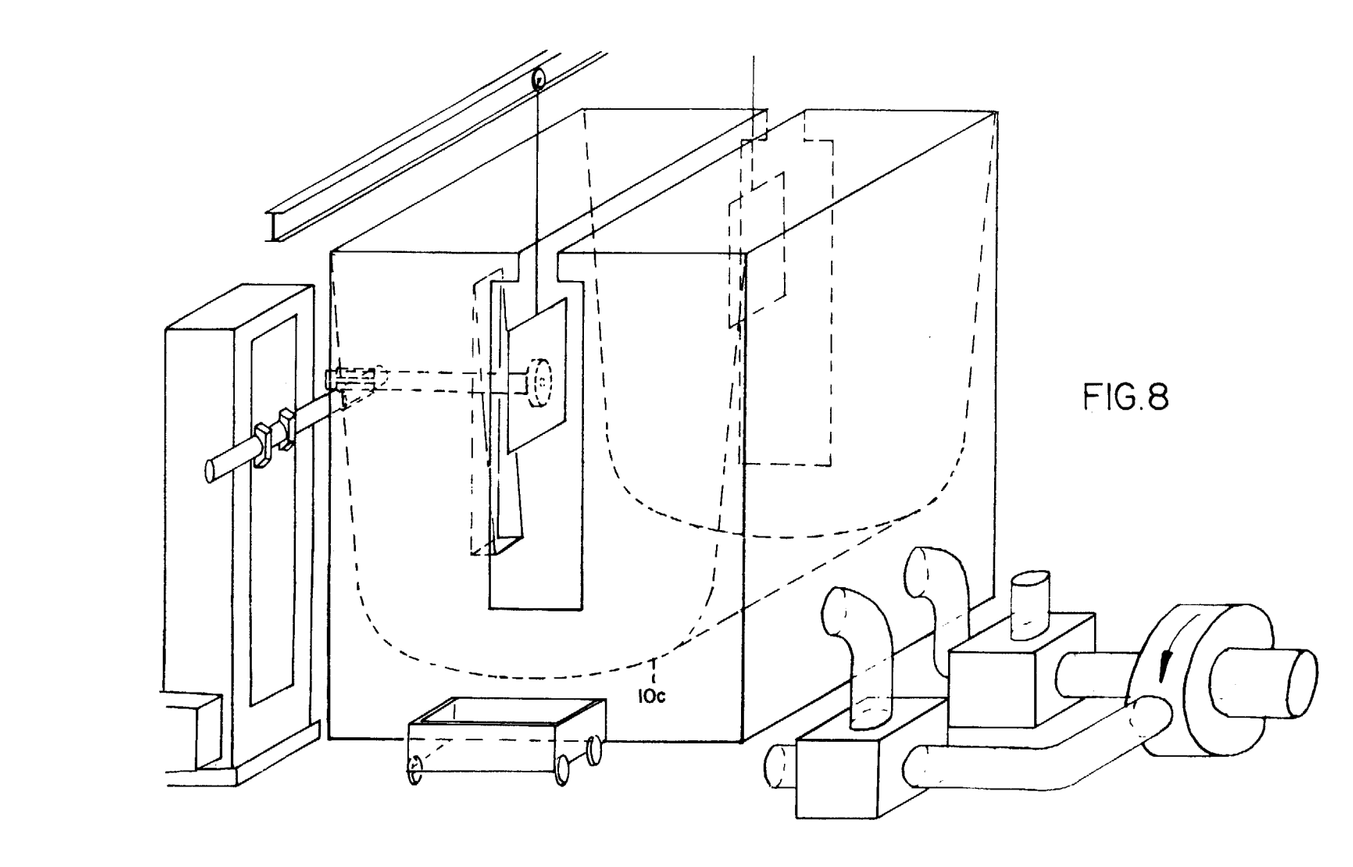
FIG. 8 represents diagrammatically yet another embodiment of the chamber shown in FIG. 7.

FIG. 8 shows diagrammatically an alternative form of FIG. 7, in which the concave bottom 10c extends over the entire height of the chamber. In this way, it is ensured that a smaller quantity of powder particles becomes deposited on the vertical walls of the chamber.

Figure 9:
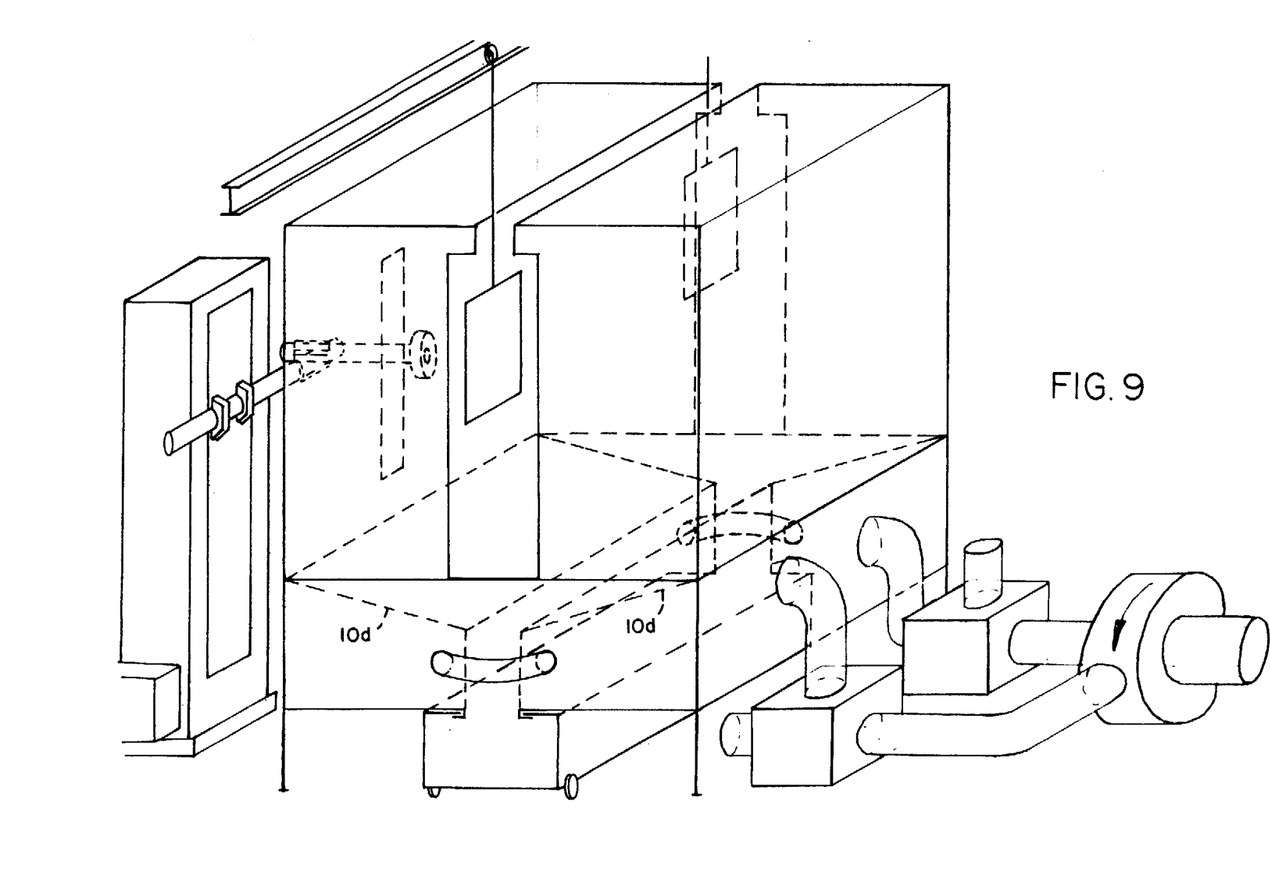
FIG. 9 is a diagrammatic view of another embodiment of the chamber shown in FIG. 1.

FIG. 9 shows diagrammatically a chamber in accordance with FIG. 1, but in which the porous bottom is formed by two planes 10d inclined towards the centre of the chamber, which enables a powder-recovery tank of greater length to be employed.

Figure 10:
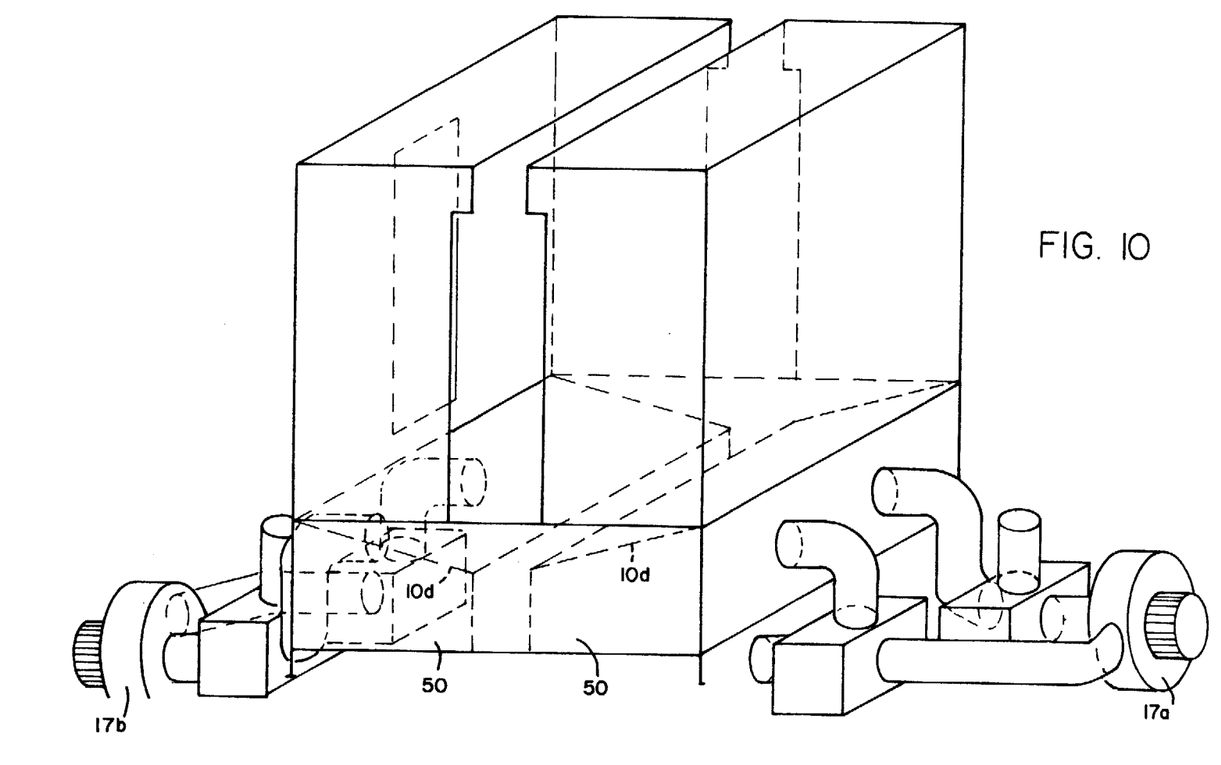
FIG. 10 shows diagrammatically an alternative form of construction of the chamber shown in FIG. 9.

FIG. 10 shows very diagrammatically a chamber similar to that of FIG. 9, but in which the closed spaces 50 located underneath each of the two inclined porous plates are pneumatically separate and are each connected to a separate blowing-suction device (17a and 17b respectively) which operates independently and following cycles which may possibly be different.

This arrangement, although more expensive, is especially advantageous in the case in which it is desired to maintain a depression in the chamber without any interruption, even of small duration. For that purpose, it is only necessary to regulate the respective cycles so that the blowing periods are never simultaneous on the two plates, and are preferably spaced widely apart. For example, the following cycles can be defined for a common period of 20 seconds:

— First plate: time 0 to 2 seconds: blowing time to 2 to 20 seconds: suction;

— Second plate: time 0 to 9 seconds: suction time 9 to 11 seconds: blowing time 11 to 20 seconds: suction.

The invention finds its utilization in installations for coating objects by an electrostatic powder deposition process necessitating at least one manual or automatic powdering chamber.

I claim:

1. A method of creating a sub-atmospheric pressure in a chamber for electrostatically depositing powder on articles therewithin, and for recovering unused surplus powder in said chamber through an opening in the bottom of said chamber, which method comprises the steps of cyclically and alternately applying to said chamber, through at least one inclined air-permeable plate which constitutes at least part of the bottom of said chamber and slopes downwardly toward said opening, outward suction for a relatively long period of time sufficient to maintain a sub-atmospheric pressure within said chamber substantially throughout its operation, and then inward gaseous pressure for a relatively short period of time sufficient to loosen any powder which has fallen onto said inclined plate so that said powder will slide down said plate and out of said chamber through said opening.

2. A method as claimed in claim 1 in which said suction is applied for from five to twenty times as long as said pressure.

3. A method as claimed in claim 2 in which said suction is applied for from 10 to 20 seconds and said pressure for from half a second to 2 seconds.

4. A method as claimed in claim 2 in which the intensity of the suction and pressure are substantially equal.

5. A method as claimed in claim 2 in which the intensity of the pressure is greater than that of the suction.

6. A method as claimed in claim 2 in which the intensity of the pressure is less than that of said suction.

7. A method as claimed in claim 1 in which said pressure is applied to one air-permeable plate of said bottom while suction is being applied to another plate.

8. A method as claimed in claim 7 in which pressure is applied to one one air-permeable part of said bottom at a time.

9. In a chamber for electrostatically depositing powder on objects therein, which chamber is equipped with means for introducing powder into said chamber and connected with means for maintaining a sub-atmospheric pressure therein, the improvement according to which the bottom of said chamber comprises at least one inclined plate made of air-permeable material and has an opening for exhausting powder adjacent the lower part of said plate, while said means for maintaining a sub-atmospheric pressure includes means cyclically and alternately suck gas from said chamber through said plate and force gas through said plate into said chamber for a period of time substantially shorter than that during which gas is sucked from said chamber, whereby a sub-atmospheric pressure is maintained within said chamber substantially throughout its operation.

10. A chamber as claimed in claim 9 in which each inclined plate has a flat surface.

11. A chamber as claimed in claim 9 comprising a plurality of inclined plates, at least one of which plates has a flat surface, while at least one other plate has a curved surface.

12. A chamber as claimed in claim 9 in which at least part of the inner surface of at least one inclined plate is roughened.

13. A chamber as claimed in claim 9 in which said inclined plate is removable.

14. A chamber as claimed in claim 9 in which each inclined plate has a curved surface.

15. A chamber as claimed in claim 14 in which said curved surface is concave as seen from inside the chamber.

16. A chamber as claimed in claim 9 in which said inclined plate is made of rigid material.

17. A chamber as claimed in claim 16 in which said material is metallic.

18. A chamber as claimed in claim 17 in which said metallic plate is connected to ground.

19. A chamber as claimed in claim 9 in which said means for alternately sucking gas from and forcing gas into said chamber comprises a single fan rotating in a single direction and valve means between said fan and permeable plate for controlling the direction of flow through said plate.

20. A chamber as claimed in claim 19 in which said valve means comprises two three-way valves.

21. A chamber as claimed in claim 20 in which each of said three-way valves comprises:

— a first opening connected to a duct terminating below said inclined plate;

— a second opening connected to a duct which terminates in the ambient air; and

— a third duct connected to the suction inlet of said fan in the case of the first of said valves and to the delivery outlet of said fan in the case of the second of said valves.

22. A chamber as claimed in claim 9 in which said bottom consists of a number of parts, each part comprising at least one inclined, air-permeable plate.

23. A chamber as claimed in claim 22 in which each of said plates is connected to an independent fan adapted to supply said suction and gaseous pressure.

* * * * *